United States Patent [19]

Earl

[11] Patent Number: 5,100,745
[45] Date of Patent: Mar. 31, 1992

[54] METHOD FOR REJUVENATING NI-H$_2$ BATTERIES

[75] Inventor: Martin W. Earl, Silver Spring, Md.

[73] Assignee: Communications Satellite Corporation, Washington, D.C.

[21] Appl. No.: 511,827

[22] Filed: Apr. 16, 1990

Related U.S. Application Data

[63] Continuation-in-part of Ser. No. 298,139, Jan. 18, 1989, abandoned.

[51] Int. Cl.$^5$ .......................................... H01M 10/42
[52] U.S. Cl. .................................... 429/49; 429/50; 429/101; 320/21
[58] Field of Search ................................ 429/49–51, 429/101; 320/21

[56] References Cited

U.S. PATENT DOCUMENTS

| | | | |
|---|---|---|---|
| 3,867,199 | 2/1975 | Dunlop et al. | 429/101 |
| 4,055,709 | 10/1977 | Medford . | |
| 4,177,328 | 12/1979 | Rogers | 429/101 X |
| 4,584,249 | 4/1986 | Smithrick | 429/101 X |
| 4,680,241 | 7/1987 | Dyer | 320/21 X |

FOREIGN PATENT DOCUMENTS 0135056 7/1984 European Pat. Off. .
87/04863 12/1986 PCT Int'l Appl. .

OTHER PUBLICATIONS

Betz et al., "Nickel-Hydrogen Storage Battery for use on Navigation Technology Satellite"-2, 11th Intersociety Energy Conversion Eng. Conf., 1976.
J. D. Dunlop, "Nickel-Hydrogen Battery Technology-Development and Status", *Comsat Technical Review*, vol. 10, No. 5, Fall 1980.
Some Initial Tests Carried Out on Nickel Hydrogen Cells with Regard to Their Usage on the Olympus Spacecraft, P. Leggett & A. Spears, pp. 1331–1338; Society of Automotive Engineers, Inc. (1985).
Life Cycle Test Results of a Bipolar Nickel Hydrogen Battery, R. L. Catalda, National Aeronautics and Space Administration, pp. 1346–1351; Society of Automotive Engineers, Inc. (1985).
Battery Development and Testing at the European Space Agency, J. Verniolle, pp. 241–265; Journal of Power Sources, 21 (1987).

*Primary Examiner*—Stephen J. Kalafut
*Attorney, Agent, or Firm*—Sughrue, Mion, Zinn, Macpeak & Seas

[57] ABSTRACT

A method for rejuvenating Ni-H$_2$ battery cells suffering a voltage anomaly providing an improved cell output voltage and capacity. After the battery containing the cells suffering the voltage anomaly is removed from service, the battery is discharged. Discharging the battery reduces the hydrogen pressure within the cells, thereby increasing the rate of mass transport of free water back to the electrode stacks of the cells. The cells are then left to stand for a period sufficient to allow any free water to diffuse back to the electrode stacks. If gravity is available, the cell can simply be rotated to return the free water to the stack.

7 Claims, 6 Drawing Sheets

METHOD FOR REJUVENATING NI-H$_2$ BATTERIES

This application is a continuation-in-part of Ser. No. 298,139 filed Jan. 18, 1989, now abandoned.

BACKGROUND OF THE INVENTION

The present invention relates to a method for rejuvenating Ni-H$_2$ batteries. More particularly, the invention relates to a method for rejuvenating Ni-H$_2$ batteries used on satellites.

In recent years, Ni-H$_2$ batteries have largely replaced Ni-Cd batteries for on-board satellite use due to numerous factors including improvements in specific energy, energy per unit volume, reliability and durability, as well as inherent overcharge and reversal protection. These batteries have found particular use in powering satellites that experience a loss of solar power for daily periods of a few minutes to more than an hour during the biannual eclipse seasons occurring at the time of the vernal and autumnal equinoxes.

Figure 1:
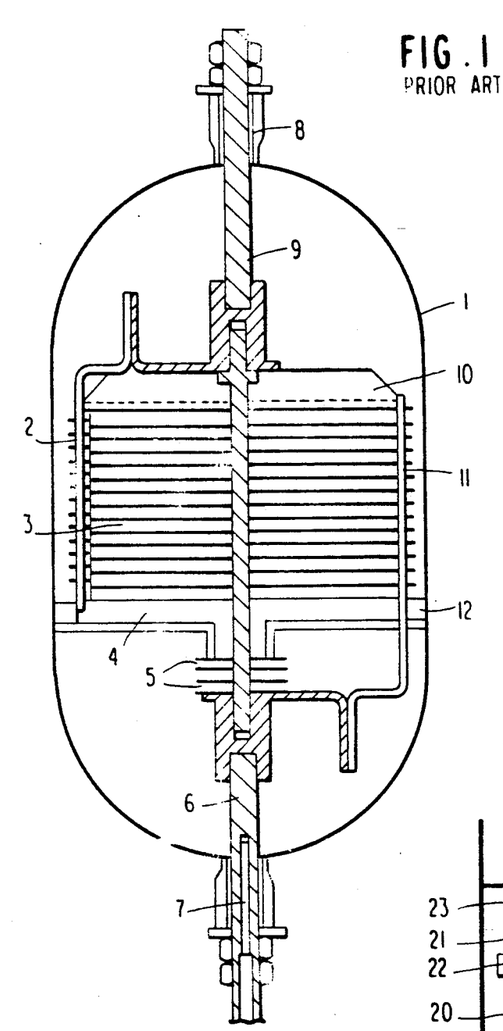
FIG. 1 is a cross-sectional view of a Ni-$H_2$ battery cell to which the method of the present invention is applied.

An example of a single cell of a Ni-H$_2$ battery is shown in cross section in FIG. 1. The cell is constructed within a cylindrical pressure vessel 1 having semispherical end portions. The pressure vessel 1 is formed by two halves joined by a weld ring 12. Inside the pressure vessel 1, an electrode stack 3 is sandwiched between a top end plate 10 and a bottom end plate 4. A positive bus bar 2 interconnects the positive electrodes of each element of the stack 3, while similarly a negative bus bar 11 interconnects the negative electrodes. A positive feedthrough conductor 9 is electrically connected with the positive bus bar 2 and extends through a seal 8 to the exterior of the pressure vessel 1, thereby forming a positive external terminal. Similarly, a negative feedthrough conductor 6 passes through a seal at the other end of the pressure vessel 1 and forms a negative external terminal. A fill port 7 is also formed with the negative feedthrough 6 to allow for initial filling of electrolyte and hydrogen gas into the pressure vessel 1. Reference numeral 5 in FIG. 1 indicates insulating washers.

Figure 2:
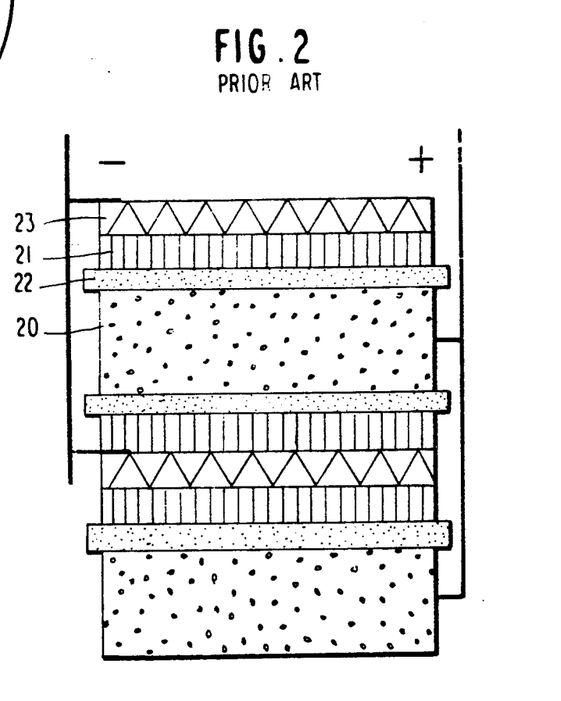
FIG. 2 is an enlarged cross-sectional partial view of an electrode stack employed in the battery cell of FIG. 1.

As shown in FIG. 2, the electrode stack is composed of alternating positive nickel hydroxide electrodes 20 and negative hydrogen electrodes 21 separated by and in contact with an electrolyte matrix 22 saturated with a potassium hydroxide solution. The positive nickel hydroxide electrodes may be fabricated, for example, of 0.75 mm nickel sinters impregnated using a chemical, electrochemical or Fleischer method with Ni(OH)$_2$. The negative hydrogen electrodes may be formed of a film of Teflon-bonded platinum black 0.25 mm thick onto which is pressed a nickel screen. The back side of the electrode has a wet-proofing Teflon layer. The positive and negative electrodes are separated by a separator made, for instance, of asbestos. A gas diffusion mesh 23 made of a metal or plastic is disposed on the opposite side of the negative electrode.

The electrochemical reactions for the two electrodes are as follows:

Positiive Nickel Electrode:

Negative Hydrogen Electrode:

Net Reaction:

The net reaction shows hydrogen reduction of nickelic hydroxide to nickelous hydroxide on discharge with no net change in KOH concentration or in the amount of water within the cell.

Further details concerning the construction and operation of these cells may be learned from, for example, U.S. Pat. No. 3,867,199 to Dunlop et al.; F. Betz et al., Nickel-Hydrogen Storage Battery for Use on Navigation Technology Satellite-2, 11th Intersociety Energy Conversion Engineering Conference, 1976; and J. D. Dunlop et al., Nickel-Hydrogen Battery Technology Development and Status, *Comsat Technical Review*, vol. 10, no. 2, fall 1980.

However, a heretofore unexplained anomaly has been observed in these batteries. Namely, there has been observed a degradation in voltage performance in some of the cells in multi-cell batteries.

For instance, a 27-cell Ni-H$_2$ battery was submitted to a life test. Table 1 below lists the output voltages at the conclusion of nine eclipse seasons from five of the cells following a 72-minute discharge test together with the average voltages of the remaining 21 cells. The inferior performance of these five cells is apparent.

TABLE 1

| Eclipse Season | Cell No. 4 | Cell No. 17 | Cell No. 20 | Cell No. 25 | Cell No. 26 | Normal Cell Av. |
|---|---|---|---|---|---|---|
| 1 | 1.210 | 1.213 | 1.203 | 1.207 | 1.206 | 1.212 |
| 2 | 1.148 | 1.194 | 1.181 | 1.193 | 1.187 | 1.210 |
| 3 | 1.196 | 1.201 | 1.194 | 1.204 | 1.204 | 1.208 |
| 4 | 1.194 | 1.186 | 1.190 | 1.176 | 1.204 | 1.205 |
| 5 | 1.206 | 1.209 | 1.199 | 1.204 | 1.202 | 1.206 |
| 6 | 1.204 | 1.194 | 1.206 | 1.194 | 1.217 | 1.205 |
| 7 | 1.184 | 1.178 | 1.205 | 1.185 | 1.205 | 1.207 |
| 8 | 1.121 | 1.171 | 1.120 | 1.167 | 1.194 | 1.207 |
| 9 | 1.116 | 1.167 | 1.139 | 1.163 | 1.189 | 1.207 |

Prior to the present invention, the reason for this degradation and a method for rejuvenating batteries containing cells suffering such a degradation were unknown.

SUMMARY OF THE INVENTION

It was unexpectedly discovered by the inventor that the heretofore unexplained degradation in voltage performance of some cells of Ni-Hz batteries was due to a loss of water from the cell stack. This finding was unexpected in that the above-presented known electrochemical equations indicate no net gain or loss of water. That is, the water component in the reaction is predicted to exist for only a short period. The reason for this water loss is as yet not fully explained.

In view of this finding, the inventor was able, by applying the principles of vaporization and diffusion, to formulate a method for rejuvenating Ni-H$_2$ batteries in which the lost water is returned to the stack. More specifically, in accordance with the inventive method, to rejuvenate a Ni-H$_2$ battery having one or more cells suffering a degradation in voltage performance, after removing the battery from service, the hydrogen pressure within the cells is then reduced. This is done by fully discharging the cells, or at least discharging the cells as much as possible. The battery is then left to stand for a period sufficient for the lost water to return to the stack by diffusion.

In a terrestrial application where gravity is available, the cell can simply be rotated to return the free water to the stack.

DESCRIPTION OF THE PREFERRED EMBODIMENTS

The invention will now be described in detail with reference to preferred embodiments thereof.

To attempt to uncover the source of the voltage anomaly problem, various tests were carried out by the inventor. In one series of such tests, it was unexpectedly discovered that s cells suffering the voltage anomaly contained water within their housings, that is, outside of the stack. Cells suffering no voltage anomaly were found to contain no water outside of their electrode stacks. This finding was unexpected because the well-known reaction equations describing the electrochemical reactions inside the electrode stack show that water outside the electrolyte should exist for only a very short amount of time, certainly insufficient to allow the water to leave the stack via any known mechanism. The reason for the loss of water in some cells and not in others is not understood at this time. One possible mechanism though would require a catalytic site external to the stack, such that when oxygen is generated during overcharge, some would recombine with hydrogen outside the plate stack. The water produced as a result of this external recombination would collect in the pressure vessel. This water would have tendency to return to the stack by way of vapor diffusion due to the greater vapor pressure of water over water than of water over the electrolyte. However, the rate of water return to the stack during normal operating conditions of the battery is apparently less than the rate of water generation by whatever mechanism is responsible.

When water is lost from the stack, the concentration of KOH increases and the volume of KOH decreases in the stack and the cell voltage is adversely affected due to ohmic and electrochemical effects.

Once the source of the voltage degradation problem was uncovered, the inventor was successful in formulating a method for rejuvenating batteries containing cells having a degraded output voltage.

To rejuvenate such a battery, after the battery is taken out of service, it is discharged, preferably completely, but in any event as far as possible. The battery is then left to stand for a period of time sufficient for the water to diffuse back to the stack.

The time the battery should be left to stand is dependent upon a number of factors, including the geometry of the cell. Since it would be very difficult to accurately compute this time, it is preferred that the time be determined empirically for any given cell type and set of ambient conditions.

Raising the temperature of the cell ca be done to reduce the required standing time. An increase in temperature from 0° C. to 30° C. has been found to increase the diffusion coefficient of water to the stack by about 10%, yielding a corresponding reduction in the required standing time.

As to the degree of discharge, although complete or nearly complete discharge is preferred, it has been verified that in practice discharging the cell until its output voltage is 1 V or less will suffice.

Figure 3:
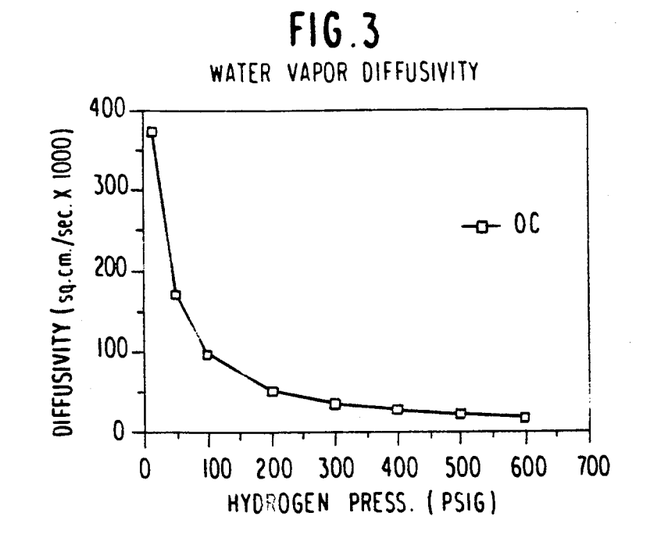
FIG. 3 is a graph showing the relationship between water vapor diffusivity and hydrogen pressure inside of the cell.

Discharging the battery very significantly lowers the pressure of hydrogen within the cells' pressure vessels due to the consumption of hydrogen gas. As illustrated by the graph of FIG. 3, reducing the pressure of hydrogen beyond a certain level, typically about 50-100 psig, greatly increases the diffusivity of the water to the electrolyte contained in the stack, thereby causing the rate of return of water to the stack to be greater than its rate of generation and reducing the total time required for rejuvenating the battery.

That is, with respect to vapor phase transfer of the water, while the rate of transfer is directly proportional to the difference in vapor pressure of water over water as opposed to water over the electrolyte, it is also directly proportional to the diffusion coefficient. The diffusion coefficient in turn is inversely proportional to the absolute pressure of the system, as shown by FIG. 3, which shows the relation between water vapor diffusivity and hydrogen pressures. Thus, the diffusion coefficient and, therefore, the rate of water transport back to the stack is dramatically increased by decreasing the cell hydrogen pressure. Specifically, the rate of water transport back to the stack is increased by a factor of about five by reducing the hydrogen pressure from 600 to 100 psig, which is accomplished by substantially discharging the cell. A further benefit in discharging the cell is the increase in cell stack electrolyte concentration, which increases the difference in vapor pressures. The combined effect is to increase the mass transport rate by about a factor of seven.

Experiments were conducted to verify the effects of the invention. Four Ni-$H_2$ cells of a type used in the INTELSAT V satellite were removed from a life test at the end of the eleventh eclipse season. For experimental purposes, the cells were provided with valve stems leading to the interior of the pressure vessels. The cells were first discharged at 15 A to 0.1 V and were then pressurized to 120 psig and put through a standard capacity cycle (16 hour charge at 3.0 A followed by discharge to 0.1 V at 15 A). Two cells were chosen for study. Cell No. 1 had no accumulated water outside the stack, while Cell No. 2 had accumulated 8.5 ml of water, which was removed.

Hydrogen gas was first removed from Cells Nos. 1 and 2, and then the cells were purged with nitrogen. The valve stems were removed and the two cells weighed. The cells were next installed so that water could not run into the stack, and approximately 10 ml of deionized water was then injected into each cell through fill tubes. Both cells were weighed again and then refitted with valve stems. Hydrogen was used to purge the cells. Finally, they were pressurized with hydrogen to pressure of 100 psig. Both cells were put into room temperature storage for one month along with the remaining two cells (Cells Nos. 3 and 4), to which nothing was done. At the end of one month, both a water drain and a pressure check were performed on all four cells.

The results showed that all 10 ml of water introduced into both cells diffused into the stack during the one-month storage period. The hydrogen pressure was then increased to 50 psig and the cells were again cycled.

Figure 4:
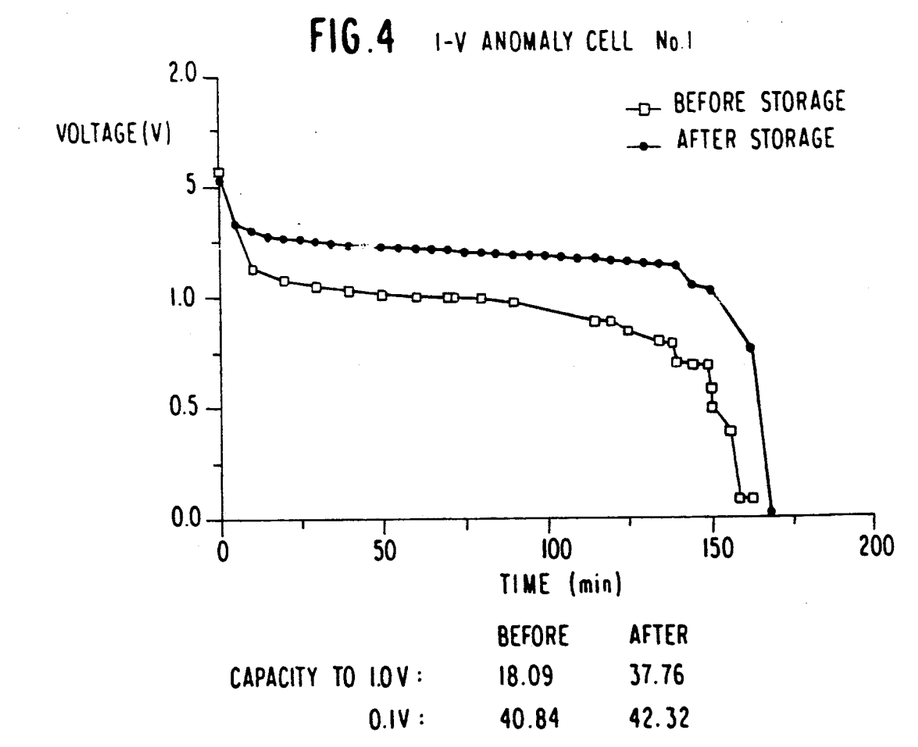
FIGS. 4 through 7 are graphs showing voltage-time characteristics of four test cells.
Figure 5:
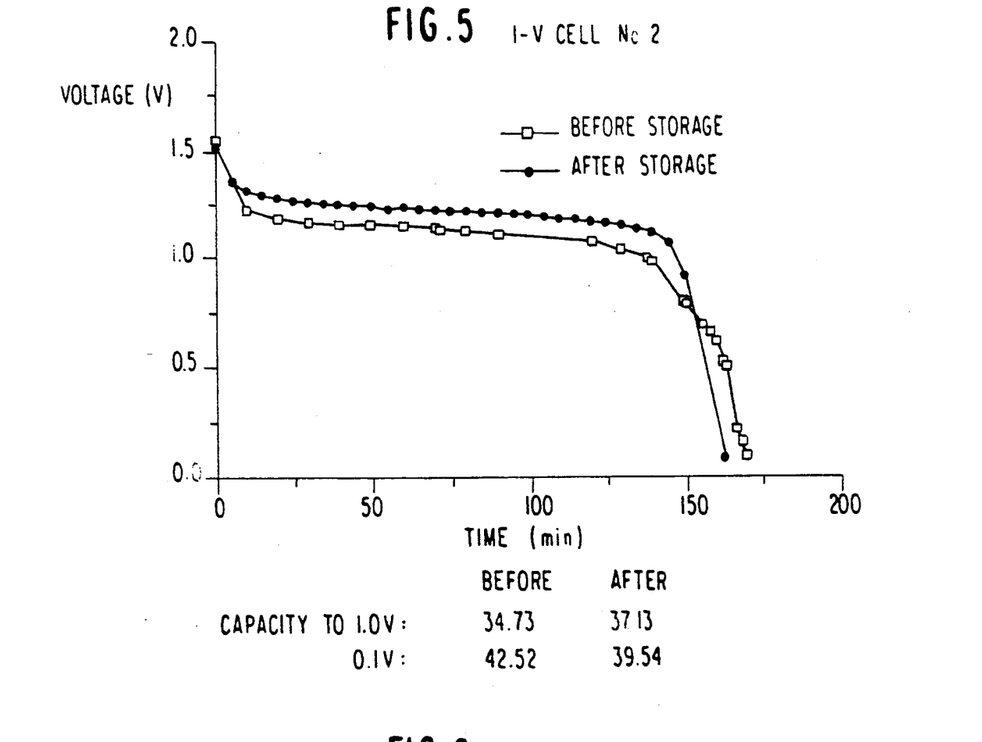

Voltage performance and capacity measurements following storage were then compared to measurements taken before storage. As shown in FIGS. 4 and 5, the return of water by diffusion into the stack of Cell No. 1 restored it to the pre-anomalous condition. That is, a significant voltage increase and corresponding capacity increase occurred. Cell No. 2 experienced a smaller voltage and capacity increase, which can be attributed to the substantial reduction in its electrolyte concentration by the additional 10 ml of water. Relatively little change in the performance of Cells No. 3 and 4 before and after storage was noted.

Figure 6:
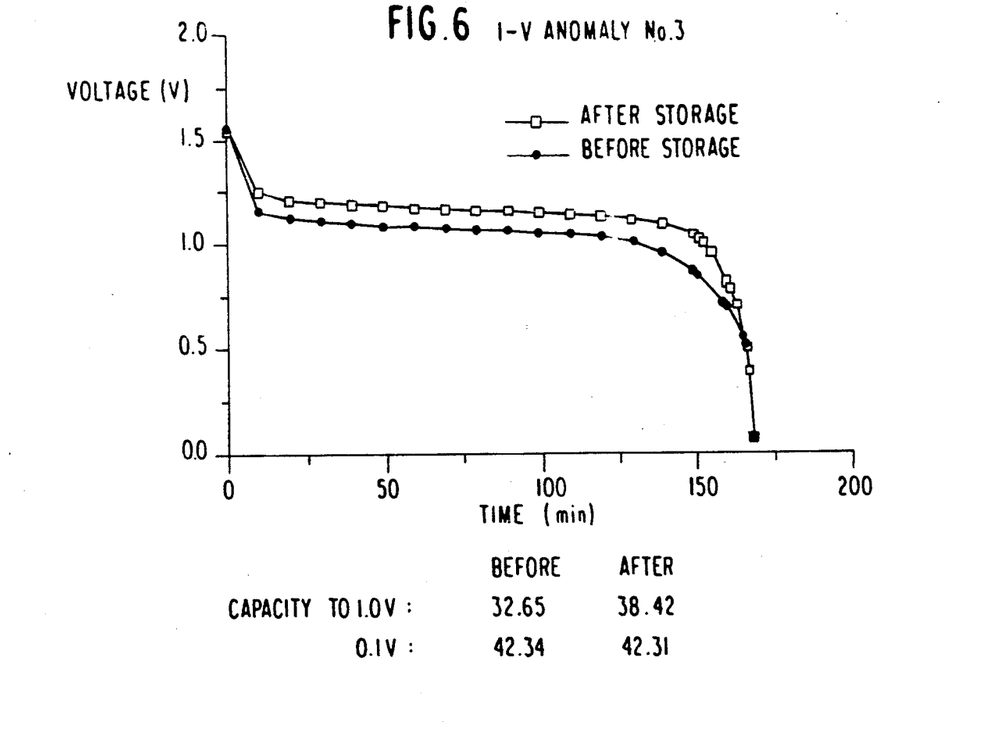
Figure 7:
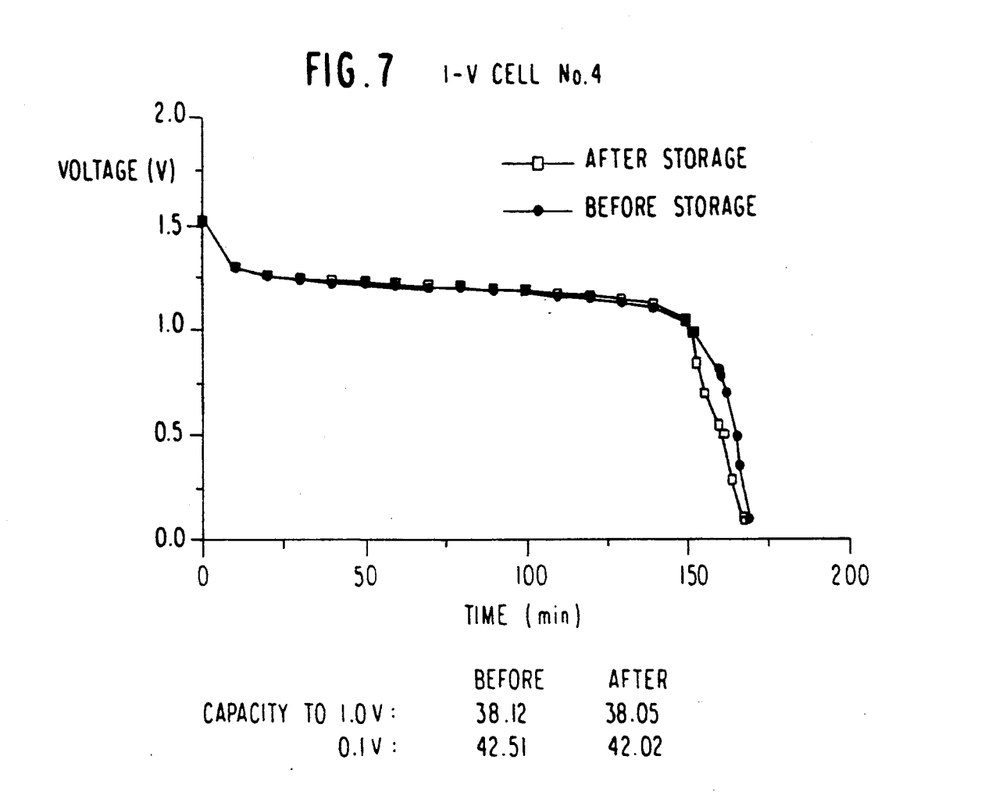

Cells Nos. 3 and 4 were then subjected to an identical study. All procedures used for testing Cells Nos. 1 and 2 in the first test were again used, except for the duration of storage and the amount of water injected. Storage was carried out for a period of one week to evaluate the rate of water diffusion. In the case of Cell No. 3, only 5.0 ml of water was injected (approximately the same amount that had earlier been drained out of the cell), while for Cell No. 4, 10.3 ml of water was injected. After one week of storage, water was drained from both cells. Of the 5.0 ml of water injected into Cell No. 3, a total of 4.1 ml had diffused into the stack. In Cell No. 4, of the 10.3 ml of water injected, 4.3 ml had diffused into the stack. Discharge profiles for Cells. Nos. 3 and 4 are shown in FIGS. 6 and 7. In the case of Cell No. 3, an increase in voltage was noted, while very little change was noted in Cell No. 4.

Figure 8:
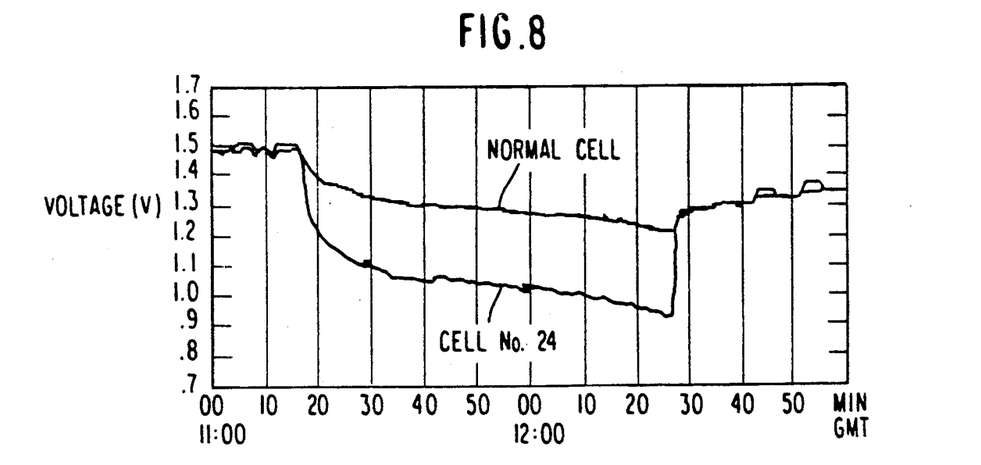
FIG. 8 is a graph comparing the voltage output over time of a cell suffering from a voltage anomaly compared with that of a normal cell in an actual Ni-$H_2$ battery.
Figure 9:
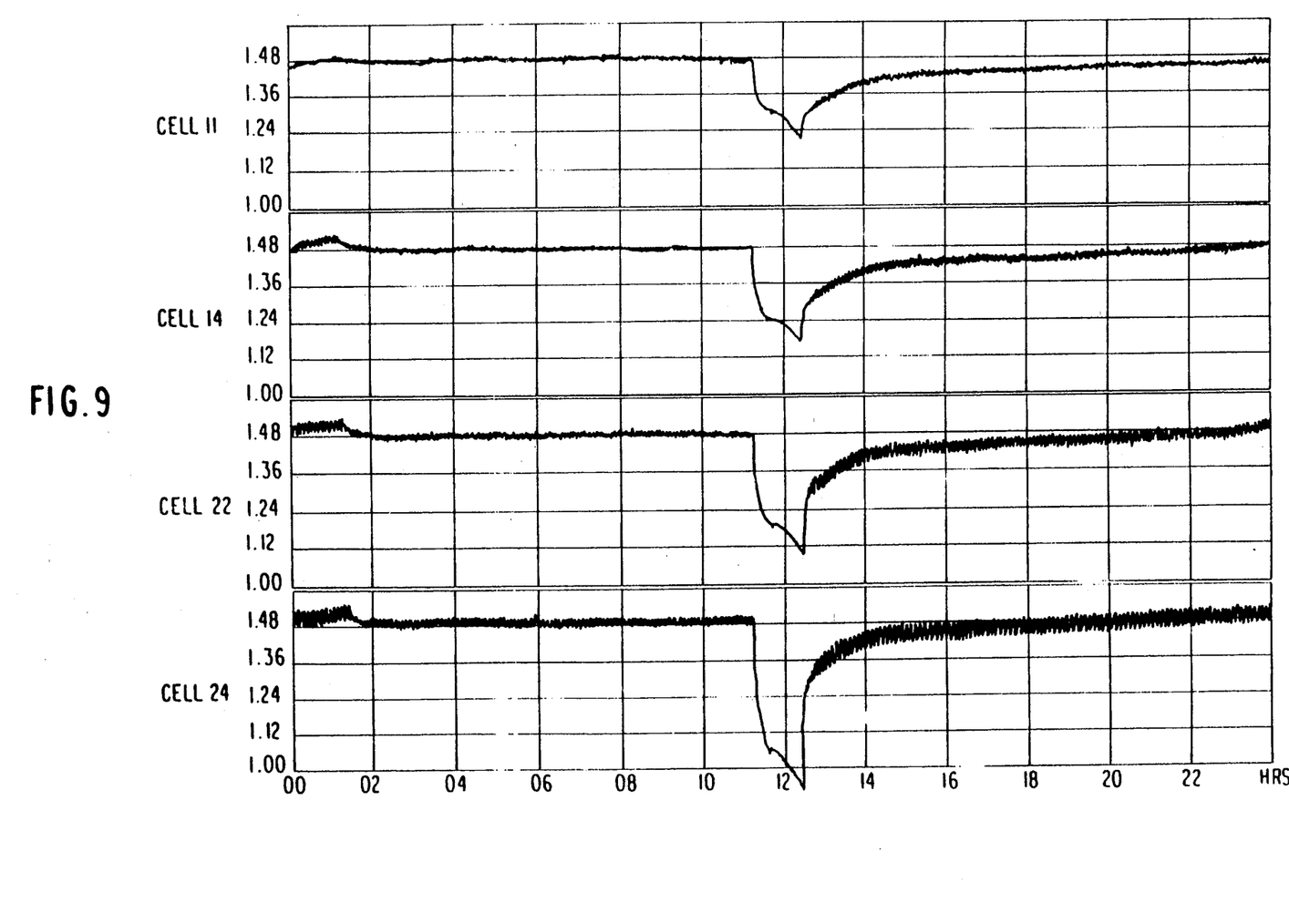
FIG. 9 is a graph comparing the outputs over time of several cells of an actual Ni-$H_2$ battery prior to rejuvenation.
Figure 10:
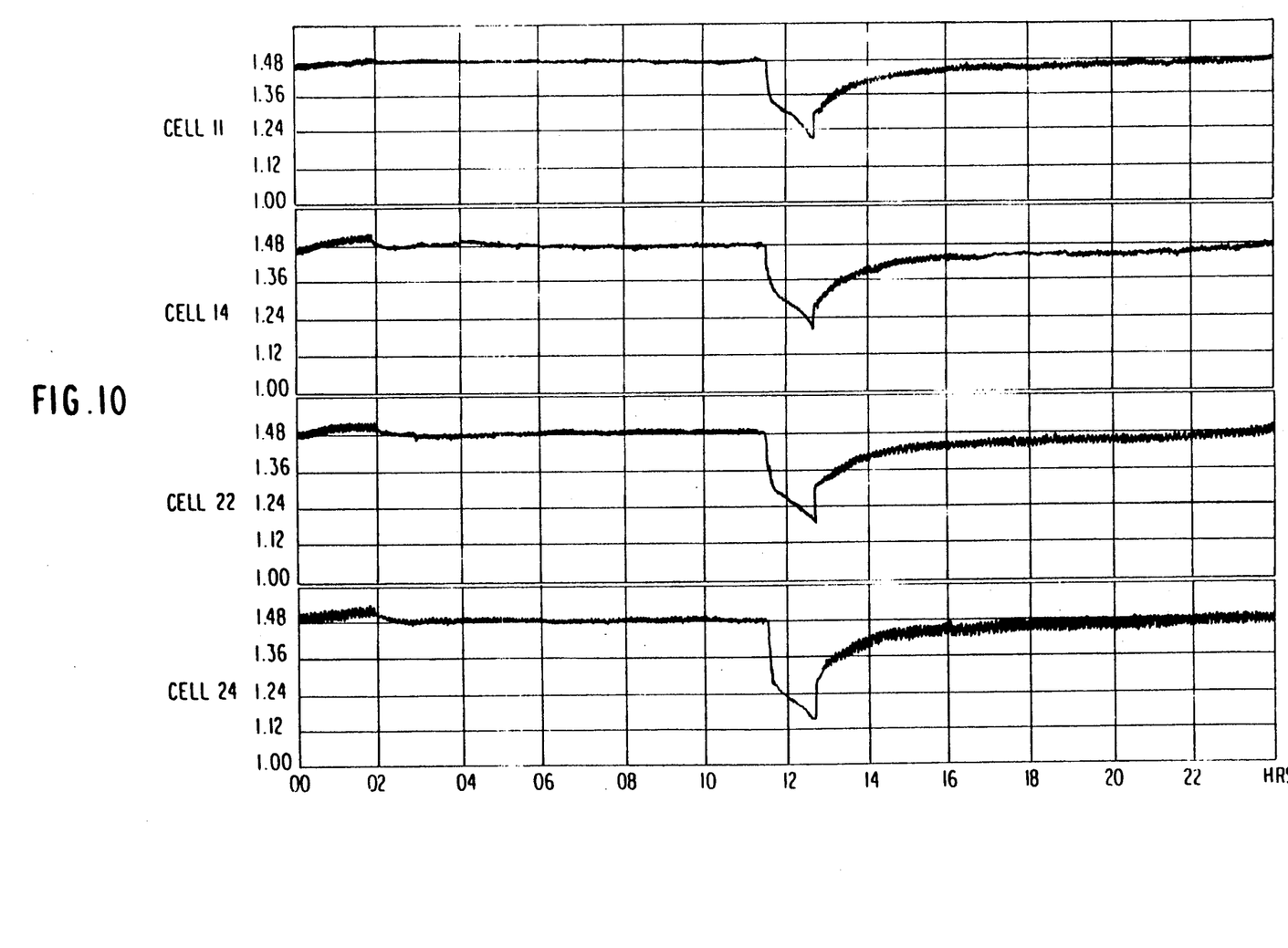
FIG. 10 is a graph comparing the outputs over time of the same cell following rejuvenation in accordance with the method of the invention.

Further, tests of the invention were conducted on an in-orbit Ni-$H_2$ battery. Specifically, as shown by FIG. 9, which is a graph showing the voltage output of several cells of an in-orbit INTELSAT V spacecraft over a period of one day in which the battery was at first charged and then trickle charged (00 to approx. 11.5 HRS), then used to power the spacecraft (approx. 11.5 to approx. 12.5 HRS), and finally charged for the next cycle of use (approx. 12.5 to 24 HRS). In particular, Cells Nos. 14, 22 and 24 exhibited lower-than-average end-of-discharge voltages. The lowest cell (No. 24) had a voltage profile as shown in FIG. 8, where it is compared with a normal cell. A rejuvenation procedure as described above was then carried out for a period of two weeks. The resulting performance is shown in Table 2 below and in FIG. 10 where the discharge voltage characteristics of the same cells of the battery are shown for the subsequent equinox. Specifically, Cell no. 24 exhibited an improvement in the end-of-discharge voltage of 191 mV. The efficacy of the method of the invention was thus demonstrated.

TABLE 2

| Cell No. | Autumnal Equinox | Vernal Equinox | Change |
|---|---|---|---|
| 1 | 1.204 | 1.204 | — |
| 2 | 1.191 | 1.185 | −0.006 |
| 3 | 1.210 | 1.204 | −0.006 |
| 4 | 1.185 | 1.204 | +0.019 |
| 5 | 1.204 | 1.191 | −0.013 |
| 6 | 1.197 | 1.197 | — |
| 7 | 1.204 | 1.204 | — |
| 8 | 1.197 | 1.197 | — |
| 9 | 1.210 | 1.204 | −0.006 |
| 10 | 1.210 | 1.210 | — |
| 11 | 1.204 | 1.197 | −0.007 |
| 12 | 1.204 | 1.197 | −0.007 |
| 13 | 1.210 | 1.204 | −0.006 |
| 14 | 1.153 | 1.191 | +0.038 |
| 15 | 1.210 | 1.204 | −0.006 |
| 16 | 1.197 | 1.197 | — |
| 17 | 1.210 | 1.204 | −0.006 |
| 18 | 1.204 | 1.204 | — |
| 19 | 1.178 | 1.185 | +0.007 |
| 20 | 1.204 | 1.197 | −0.007 |
| 21 | 1.210 | 1.204 | −0.006 |
| 22 | 1.089 | 1.166 | +0.077 |
| 23 | 1.216 | 1.210 | −0.006 |
| 24 | 0.930 | 1.121 | +0.191 |
| 25 | 1.197 | 1.197 | — |
| 26 | 1.185 | 1.197 | +0.012 |
| 27 | 1.197 | 1.197 | — |

Further, in a terrestrial application where gravity is present, the cell can be rotated to a position where the free water can re-enter the stack. The same advantages as in the above-discussed embodiment are obtained.

This completes the description of the preferred embodiments of the invention. Although preferred embodiments have been described, it is believed that numerous modifications and alterations thereto would be apparent to one of ordinary skill in the art.

What is claimed is:

1. A method for rejuvenating a Ni-$H_2$ battery cell having an electrode stack to restore the voltage output of the battery cell, comprising the steps of:

detecting the presence of a voltage anomaly within said cell;

removing said cell from service;

reducing the pressure of hydrogen within said cell;

allowing said cell to stand for a sufficient time to allow any free water in said cell to diffuse back to said stack such that the voltage output of said cell will be restored upon subsequent recharging;

recharging said cell; and returning said cell to service.

2. The method for rejuvenating a Ni-$H_2$ battery cell of claim 1, wherein said step of reducing the pressure of hydrogen within said cell comprises substantially discharging said battery.

3. The method for rejuvenating a Ni-$H_2$ battery of claim 2, wherein said cell is substantially completely discharged.

4. The method for rejuvenating a Ni-$H_2$ battery of claim 2, wherein said cell is discharged until an output voltage thereof is 1 V or less.

5. The method for rejuvenating a Ni-$H_2$ battery of claim 1, further comprising the step of heating said cell during at least a portion of the time s id cell is standing.

6. A method for rejuvenating a Ni-$H_2$ battery cell having an electrode stack to restore the voltage output of the battery cell, comprising the steps of:

detecting the presence of a voltage anomaly within said cell;

removing said cell from service;

returning any free water in said cell to said stack such that the voltage output of said cell will be restored upon subsequent recharging;

recharging said cell; and returning said cell to service.

7. A method for rejuvenating a Ni-H$_2$ battery cell having an electrode stack to restore the voltage output of the battery cell, comprising the steps of:

detecting the presence of a voltage anomaly within said cell;

removing said cell from service;

rotating said cell to allow any free water in said cell to return to said stack such that the voltage output of said cell will be restored upon subsequent recharging;

recharging said cell; and returning said cell to service.

* * * * *

UNITED STATES PATENT AND TRADEMARK OFFICE
CERTIFICATE OF CORRECTION

PATENT NO.  : 5,100,745
DATED       : March 31, 1992
INVENTOR(S) : Martin W. Earl It is certified that error appears in the above-identified patent and that said Letters Patent is hereby corrected as shown below:

Col. 1, line 62, delete "Positiive" insert --Positive--

Col. 3, line 40, after "that" delete "s"

Col. 4, line 16, delete "ca" insert --can--

Col. 6, line 65, delete "s id" insert --said--

Signed and Sealed this

Seventh Day of September, 1993

Attest:

BRUCE LEHMAN

Attesting Officer

Commissioner of Patents and Trademarks